(12) United States Patent
David

(10) Patent No.: US 6,325,723 B1
(45) Date of Patent: Dec. 4, 2001

(54) PRECOMPRESSED, RADIALLY SOFT DRIVE COUPLING

(75) Inventor: Thomas A. David, Erie, PA (US)

(73) Assignee: Lord Corporation, Cary, NC (US)

( * ) Notice: Subject to any disclaimer, the term of this patent is extended or adjusted under 35 U.S.C. 154(b) by 1009 days.

(21) Appl. No.: 08/801,872

(22) Filed: Feb. 18, 1997

Related U.S. Application Data

(63) Continuation of application No. 08/438,822, filed on May 11, 1995, now abandoned.

(51) Int. Cl.[7] ................................................. F16D 3/52
(52) U.S. Cl. .................................... 464/96; 464/90
(58) Field of Search .......................... 464/96, 90, 94, 464/92, 87; 403/333, 334, 375

(56) References Cited

U.S. PATENT DOCUMENTS

| | | | |
|---|---|---|---|
| 1,868,818 | * | 7/1932 | Eksergian ............... 464/90 |
| 3,509,974 | * | 5/1970 | Kampert et al. ............ 464/90 X |
| 4,376,593 | * | 3/1983 | Schaefer ............... 403/334 X |

FOREIGN PATENT DOCUMENTS

818803 * 8/1959 (GB) ..................... 464/96

* cited by examiner

Primary Examiner—Emmanuel M. Marcelo
(74) Attorney, Agent, or Firm—Randall S. Wayland; Richard K. Thomson

(57) ABSTRACT

A radially soft drive coupling for reducing vibration transmitted across the coupling in certain marine drive applications. The elastomeric elements interconnecting the hub and housing are precompressed by an amount which is at least in the range of 15–20% to produce significant radial and torsional softening of the spring rate of the elastomer. The radial spring rate whose magnitude expressed in lb/in is in the range of between one half and three times the magnitude of said design torque level expressed in lb-in.

19 Claims, 3 Drawing Sheets

PRECOMPRESSED, RADIALLY SOFT DRIVE COUPLING

This application is a continuation of application Ser. No. 08/438,822, filed May 11, 1995 now abandoned.

BACKGROUND AND SUMMARY OF THE INVENTION

The present invention is directed to an improved drive coupling. More particularly, the present invention is directed to a frictional drive coupling with improved isolation characteristics resulting from radial softness.

A large number of drive couplings are on the market today. The particular application envisioned herein requires a radially soft coupling to avoid transmission of a large amount of vibration across the coupling. Specifically, in marine drive systems in which the final drive unit is attached to the hull in a rigid, non-steering manner, a radially soft coupling of the type described herein would be required.

Certain of the previously disclosed couplings depict certain of the features contemplated in the present invention but none of the devices of which Applicant is aware embody all of the relevant features. For example, an LCD coupling manufactured by the assignee of the present invention has the capability to provide overload protection by means of a compression slip fit between the elastomer and the housing. Yet, an LCD coupling would be unduly stiff in the radial direction to provide the desired isolation. A conventional soft shear coupling might provide adequate isolation but would lack the overload protection and, because such a coupling lacks significant precompression, the durability of a comparably sized coupling is wanting. Finally, a fully bonded coupling of which Applicant is aware has a number of structural similarities to the coupling of the present invention but lacks many of the performance characteristics thereof.

The present coupling places the elastomer under a significant precompression (on the order of at least 15–20% of its radial dimension). This precompression provides an axial frictional engagement between the elastomer and one of the housing or hub while substantially reducing lateral rigidity. This reduced lateral rigidity provides the desired radial softening and, additionally, provides torsional softness.

An example of a drive system in which the coupling of the present invention could be well utilized is a right-angle marine waterjet (or conventional propeller) drive having a vertical crankshaft. The vertical crankshaft drives the horizontally positioned shaft of the waterjet or propeller through a bevel gear set. The coupling of the present invention will normally be inserted in the crankshaft on a level which is approximately that of the engine mounts. The mounts will normally allow a certain side sway of the engine and the radial stiffness of the present coupling is designed to accommodate that lateral motion.

The fact that the engine's center of gravity is well above the plane of the engine mounts (and coupling), will produce a system which is modally coupled. There will be at least two, and possibly five, modes of vibration directed radially across the coupling. Engine mounting systems utilizing radially stiff couplings will typically have vibrational resonances near the normal cruise speed range resulting in ride discomfort and high equipment wear/short equipment life. The radial softness of the coupling of the present invention will lower the resonances to a frequency which is below the engine's idle speed.

A conventional coupling would have an elastomer with a radial spring rate expressed in lb/in, that is ten to twenty times the design torque of the coupling expressed in lb-in. The operational radial spring rate of the coupling of the present invention expressed in lb/in, is in the range of between one half and three times the magnitude of said design torque level expressed in lb-in., and, more preferably, having a magnitude that is approximately equal to that of the design torque.

Various other features, advantages and characteristics of the present invention will become apparent after a reading of the following specification.

BRIEF DESCRIPTION OF THE DRAWINGS

The following figures taken together with the Detailed Description, fully describe a number of embodiments of the present invention with like parts being identified with like reference numerals.

DETAILED DESCRIPTION OF THE PREFERRED EMBODIMENTS

Figure 1:
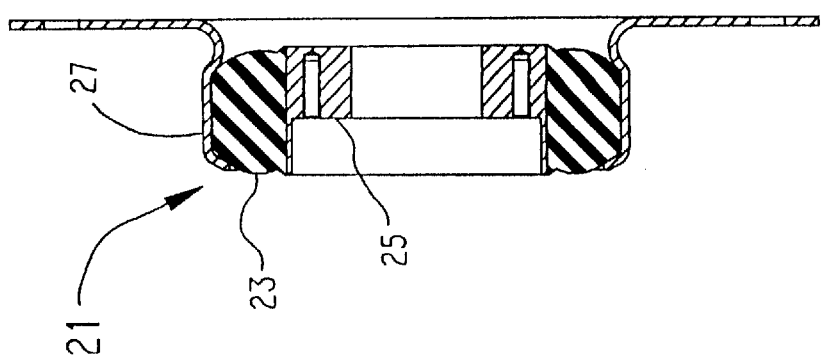
FIG. 1 is a cross-sectional side view of a first prior art coupling.

FIG. 1 depicts a prior art coupling 21 manufactured and sold by the assignee of the present invention which is identified as an LCD coupling. Elastomeric ring component 23 is bonded to hub 25 and is radially compressed by outer shell 27. The radial compression increases, rather than decreases, radial stiffness. Such a coupling would be unsuitable for the contemplated application since the high radial stiffness would be unable to provide the desired level of isolation resulting in significant vibration being transmitted from the engine to the hull of the boat. This would be exacerbated by the fact that the system resonances would typically be in the normal cruising speed of the craft.

Figure 2:
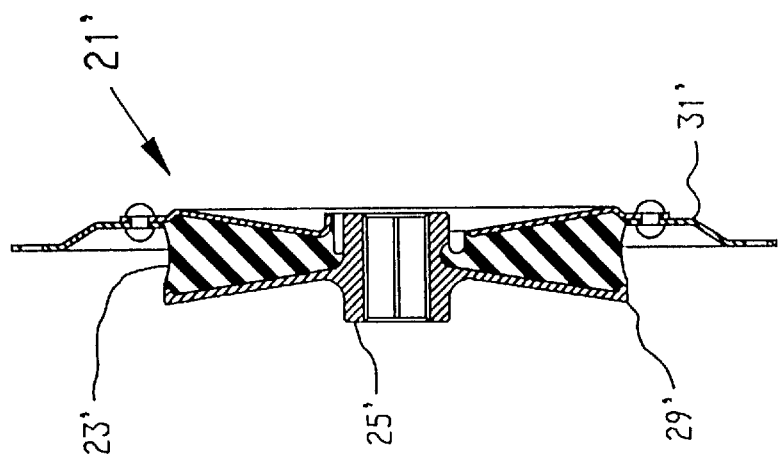
FIG. 2 is a cross-sectional side view of a second prior art coupling.

FIG. 2 depicts a second prior art coupling 21' which comprises a simple shear coupling. Plates 29', which is attached to hub 25', and 31' are bonded to the lateral faces of elastomeric member 23'. Shear coupling 21' can provide lateral and torsional softness; however, there is no significant precompression and the coupling 21' has a resultant high wear/short life and lacks the overload protection available with the present invention.

Figure 3:
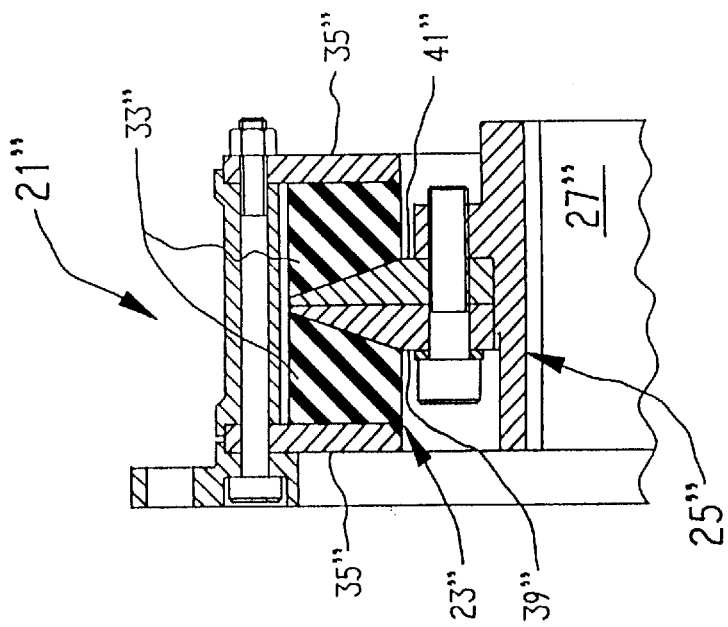
FIG. 3 is a cross-sectional side view of a third prior art coupling.

FIG. 3 shows the upper half of a third prior art coupling comprised of a dual back-to-back shear coupling in which elastomer 23" is made up of two segments 33" which are each fully bonded to one side of hub 25" and to one of side plates 35". Hub 25" includes a central cylindrical hub member 37" and a pair of separable plates 39" and 41" which can be bolted to hub member 37". Although this configuration bears a resemblance to Applicant's first embodiment, it lacks the overload protection afforded by the frictional engagement and has no significant precompression so it lacks the radial softness of the coupling of the present invention.

Figure 5:
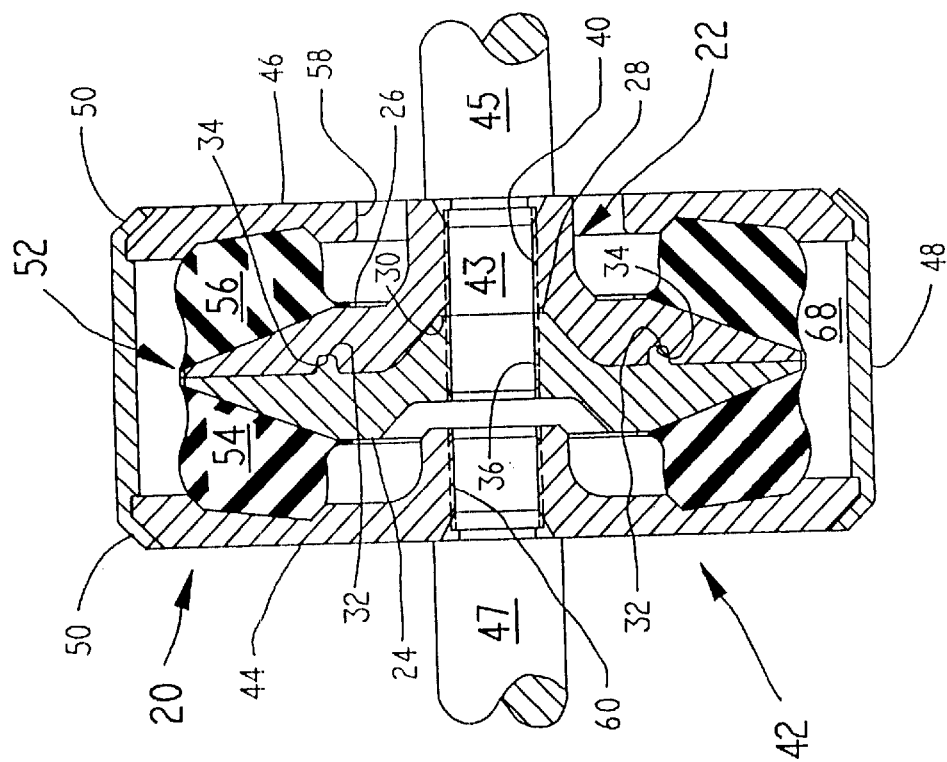
FIG. 5 is a cross-sectional side view of the coupling depicted in FIG. 4.
Figure 4:
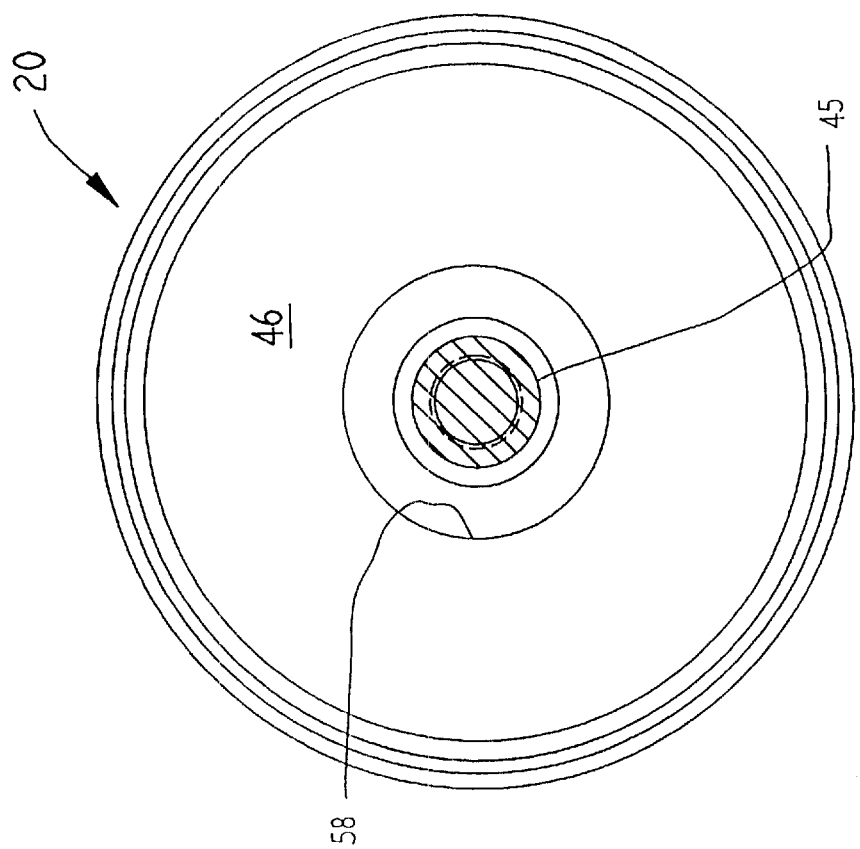
FIG. 4 is a side view of a first embodiment of the radially soft coupling of the present invention.
Figure 6:
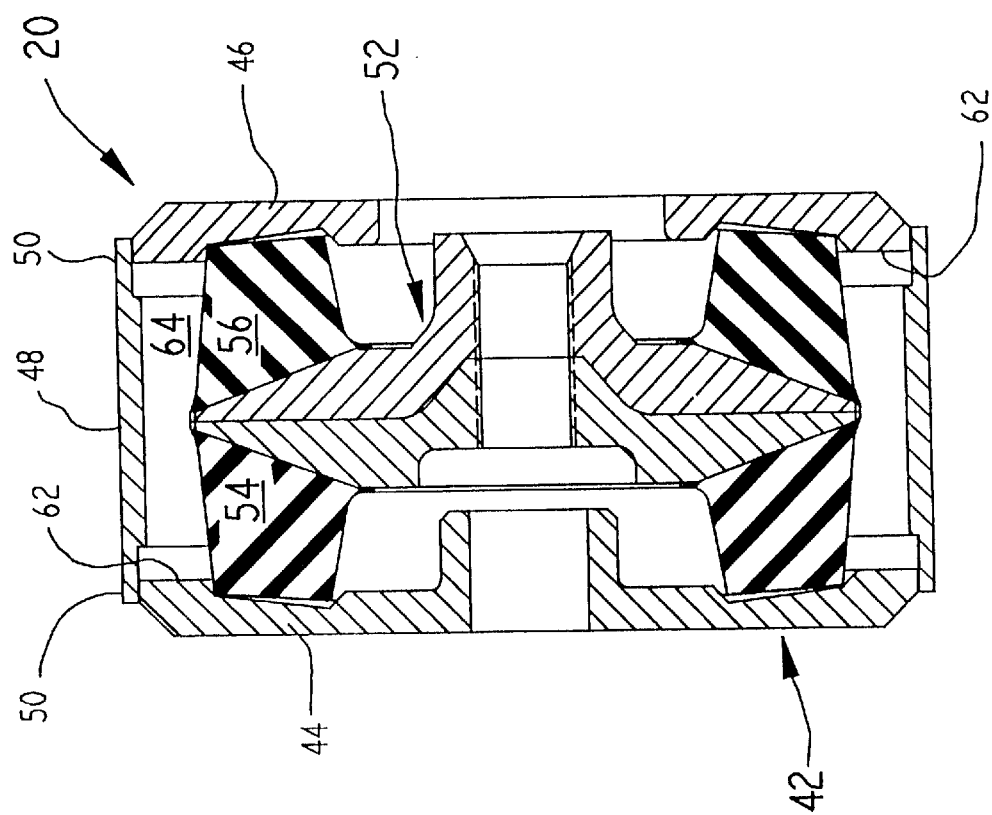
FIG. 6 is a cross-sectional side view of the first embodiment of the present invention shown prior to complete assembly.

A first embodiment of the radially soft coupling of the present invention is depicted in FIGS. 4–6 generally at 20. Coupling 20 is comprised of hub 22 and housing 42. As shown in this embodiment, hub 22 is comprised of two halves 24 and 26, the first half 24 having a frustoconical protrusion 28 which is received in a similarly shaped recess 30 in second half 26. Four protrusions 32 (two shown) on first half 24 are received in recesses 34 in second half 26 to align the two halves 24 and 26. Although first half 24 has been depicted as having four protrusions (for ease of illustration), the preferred embodiment actually has three equally spaced protrusions 32 at a common radius. Openings 36 and 40 in hub halves 24 and 26 are threaded with a right hand thread to receive threaded stub shaft 43 of input (or drive) shaft 45.

Housing 42 is comprised of first lateral plate 44, second lateral plate 46 and circumferential ring 48. Elastomer member 52 has a first elastomeric element 54 bonded to one of hub half 24 and plate 44 and having frictional engagement with the other and a second elastomeric element 56 bonded to one of said hub half 26 and plate 46 and having frictional engagement with the other member. As depicted in FIG. 5, elastomeric elements 54 and 56 are bonded to hub halves 24 and 26 and have frictional engagement with lateral plates 44 and 46 of housing 42. Large aperture 58 in plate 56, in conjunction with the free space 68 between hub 22 and housing 42, will accommodate significant lateral displacement of the engine (not shown) and shaft 45. Opening 60 in plate 44 is threaded with a left-handed thread to receive output (or driven) shaft 47.

As viewed in FIG. 6, coupling 20 is shown in partially assembled condition. Elastomeric elements 54 and 56 are shown in their uncompressed state. In completing the assembly, plates 44 and 46 are drawn together in an assembly press, or the like (not shown). The outermost edges 62 of plates 44 and 46 will be drawn down to abut annular rib 64 on ring 48. The elastomeric elements 54 and 56 are sized such that this draw down precompresses the elastomer an amount that is at least in the range of between 15 to 20% of its lateral dimension, more preferably, at least 20% precompression. Then, ends 50 of ring 50 are crimped (FIG. 5) to complete the assembly.

With this amount of precompression, the elastomer undergoes a significant amount of radial softening. This, in effect, frees hub 22 to move with drive shaft 45 without transmitting the vibrational motion to housing 42 and its interconnected driven shaft 47. The following statistics are provided by way of example and not limitation. A conventional LCD coupling designed to carry 1000–2000 lb-in torque would have a radial spring rate on the order of 20,000 lb/in. (or 10 to 20 times the design torque). A radially soft coupling made in accordance with the dictates of the present invention will have a radial spring rate in the range of 1000–3000 lb/in. (or between one-half and three times the magnitude of the design torque). This softening significantly lessens the vibrational energy transmitted across the coupling 20.

Figure 7:
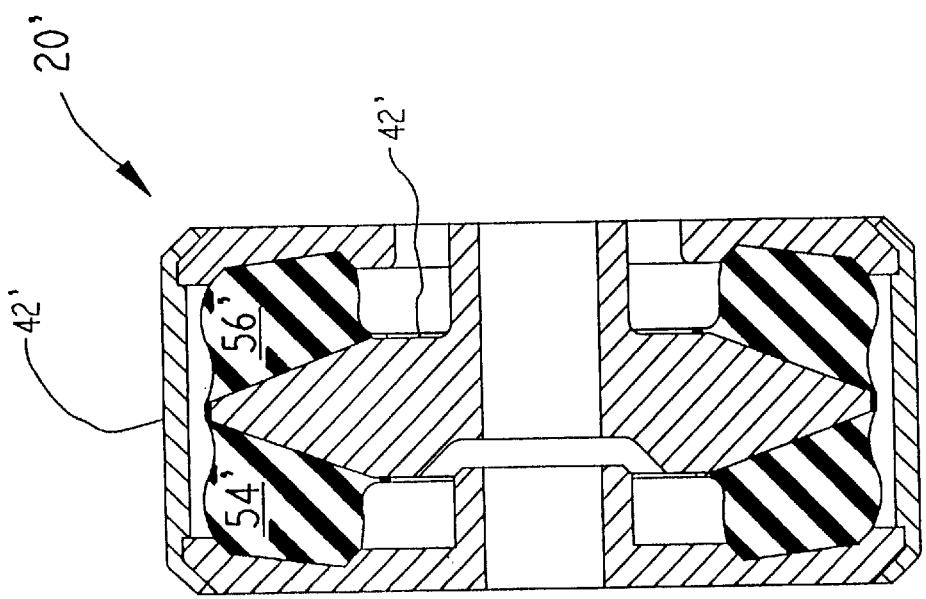
FIG. 7 is a cross-sectional side view of a second embodiment of the present invention.

FIG. 7 shows a second preferred embodiment 20' of the radially soft coupling of the present invention. In this design, hub 42' is of a one piece construction. While this design complicates the bonding step for attaching the elastomeric elements 54' and 56' to hub 42', the cost associated with the manufacture of the part can potentially be significantly reduced by eliminating the need to have a two-piece hub design with engaging pins, as was necessary in the first embodiment.

Various changes, alternatives, and modifications will become apparent following a reading of the foregoing detailed description. It is intended that all such changes, alternatives, and modifications as fall within the scope of the appended claims be considered part of the present invention.

What is claimed is:

1. A radially soft drive coupling for interconnecting a drive shaft and a driven shaft isolating transmission of vibration from said drive shaft to said driven shaft, said drive coupling having a magnitude of design torque level and comprising
   a) a housing including a first connector for attachment to one of said drive and driven shafts;
   b) a hub at least partially contained within said housing including a second connector for attachment to another of said drive and driven shafts;
   c) a radially soft elastomer member having a radial spring rate whose magnitude, when expressed in lb/in, is in the range of between one half and three times said magnitude of design torque level expressed in lb-in, said elastomer member being bonded to one of said housing and said hub and having frictional engagement with the other of said housing and said hub to transmit torsional load therebetween; said radially soft elastomer member being axially precompressed between said housing and said hub increasing frictional engagement with the other of said housing and said hub and producing additional radial softening of said elastomer whereby said driven member is substantially vibrationally isolated from said drive member.

2. The drive coupling of claim 1 wherein said elastomer member has two component elements, each of said component elements being bonded to one of said housing and said hub and frictionally engaging the other of said housing and said hub.

3. The drive coupling of claim 2 wherein said hub comprises a pair of plates which are interlocked with each other by at least one protrusion on one plate and at least one recess in another said plate.

4. The drive coupling of claim 3 wherein each of said interlocking plates has an outer face which tapers from an inner point to an outer point forming a frustoconically shaped segment.

5. The drive coupling of claim 2 wherein said hub comprises a single plate with two outer faces which each taper from an inner point to an outer point forming a frustoconically shaped segment.

6. The drive coupling of claim 2 wherein said component elements are precompressed by an amount of at least about 15%.

7. The drive coupling of claim 6 wherein said component elements are precompressed by an amount of at least 20%.

8. The drive coupling of claim 1 wherein said frictional engagement of said elastomeric member with said other of said housing and said hub slips when said design torque is exceeded.

9. The drive coupling of claim 1 wherein said hub and said elastomer member are radially spaced from an inner wall of said housing to permit relative motion therebetween.

10. A radially soft drive coupling for interconnecting a drive shaft and a driven shaft isolating transmission of vibration from said drive shaft to said driven shaft, said drive coupling having a magnitude of design torque level and comprising
    a) a housing including a first connector for attachment to one of said drive and driven shafts;
    b) a hub at least partially contained within said housing including a second connector for attachment to another of said drive and driven shafts;

c) a radially soft elastomer member which is bonded to one of said housing and said hub and has frictional engagement with the other of said housing and said hub to transmit torsional load there between, said elastomer member being precompressed between said housing and said hub to a level sufficient to obtain appreciable softening in a direction which is generally perpendicular to a direction of precompression; said precompression increasing frictional engagement with the other of said housing and said hub and producing additional radial softening of said elastomer whereby at least one of said coupling's resonances are at a frequency below a normal operating frequency of said drive member.

11. The drive coupling of claim 10 wherein said elastomer member has two component elements, each of said component elements being bonded to one of said housing and said hub and frictionally engaging the other of said housing and said hub.

12. The drive coupling of claim 11 wherein said component elements are precompressed by an amount of at least about 15%.

13. The drive coupling of claim 12 wherein said component elements are precompressed by an amount of at least 20%.

14. The drive coupling of claim 13 wherein said drive coupling has a radial spring rate whose magnitude expressed in lb/in is in the range of between one half and three times said magnitude of design torque level expressed in lb-in.

15. The drive coupling of claim 14 wherein said hub comprises a pair of plates which are interlocked with each other by at least one protrusion on one plate and at least one recess in another said plate.

16. The drive coupling of claim 15 wherein each of said interlocking plates has an outer face which tapers from an inner point to an outer point forming a frustoconically shaped segment.

17. The drive coupling of claim 14 wherein said hub comprises a single plate with two outer faces which each taper from an inner point to an outer point forming a frustoconically shaped segment.

18. The drive coupling of claim 10 wherein said frictional engagement of said elastomeric member with said other of said housing and said hub slips when said design torque is exceeded.

19. The drive coupling of claim 10 wherein said hub and said elastomer member are radially spaced from an inner wall of said housing to permit relative motion therebetween.

* * * * *